July 4, 1933.  F. X. HUBER  1,916,318
INTERNAL COMBUSTION ENGINE
Filed Aug. 23, 1930    11 Sheets-Sheet 1
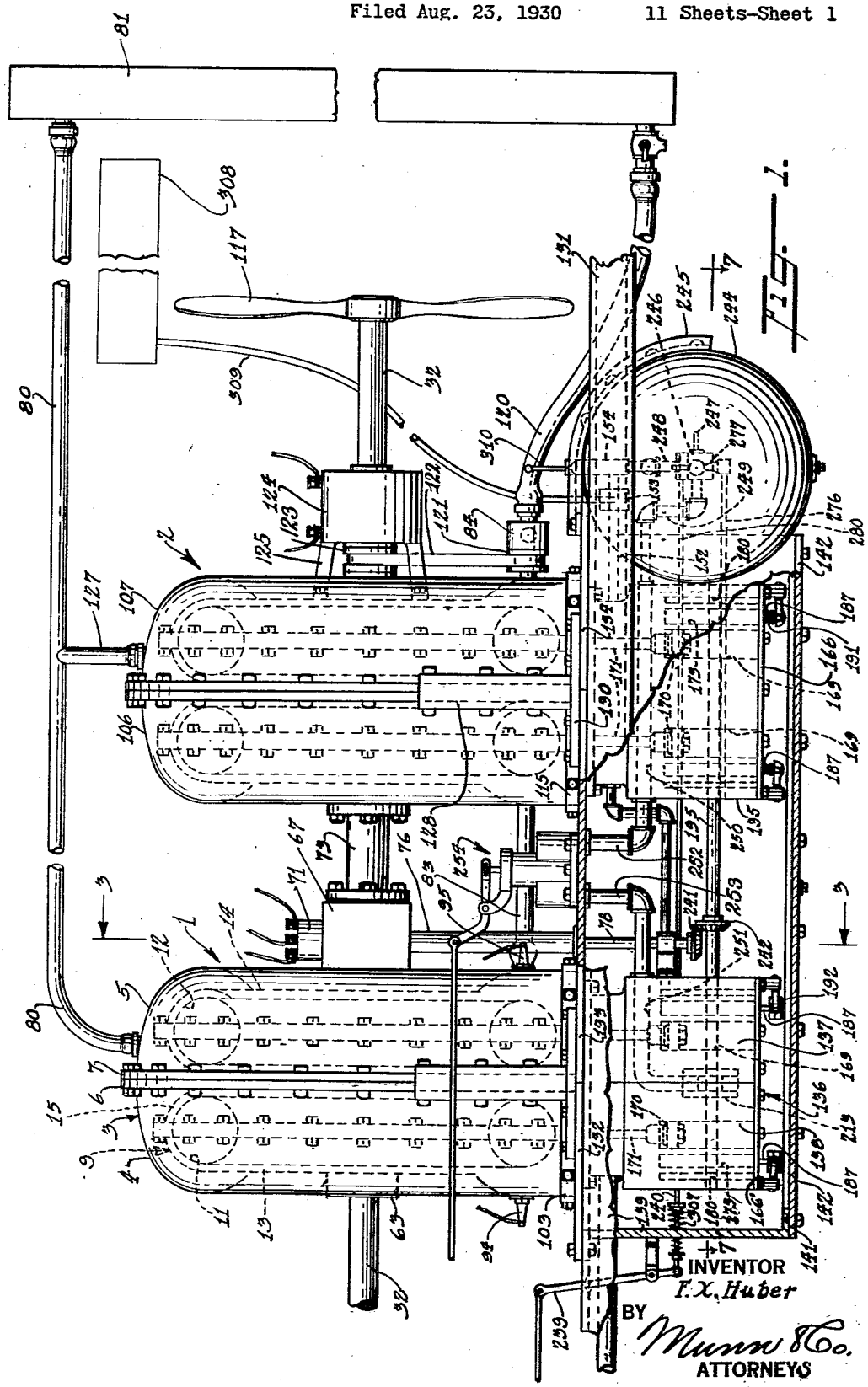
INVENTOR
F. X. Huber
BY Munn & Co.
ATTORNEYS

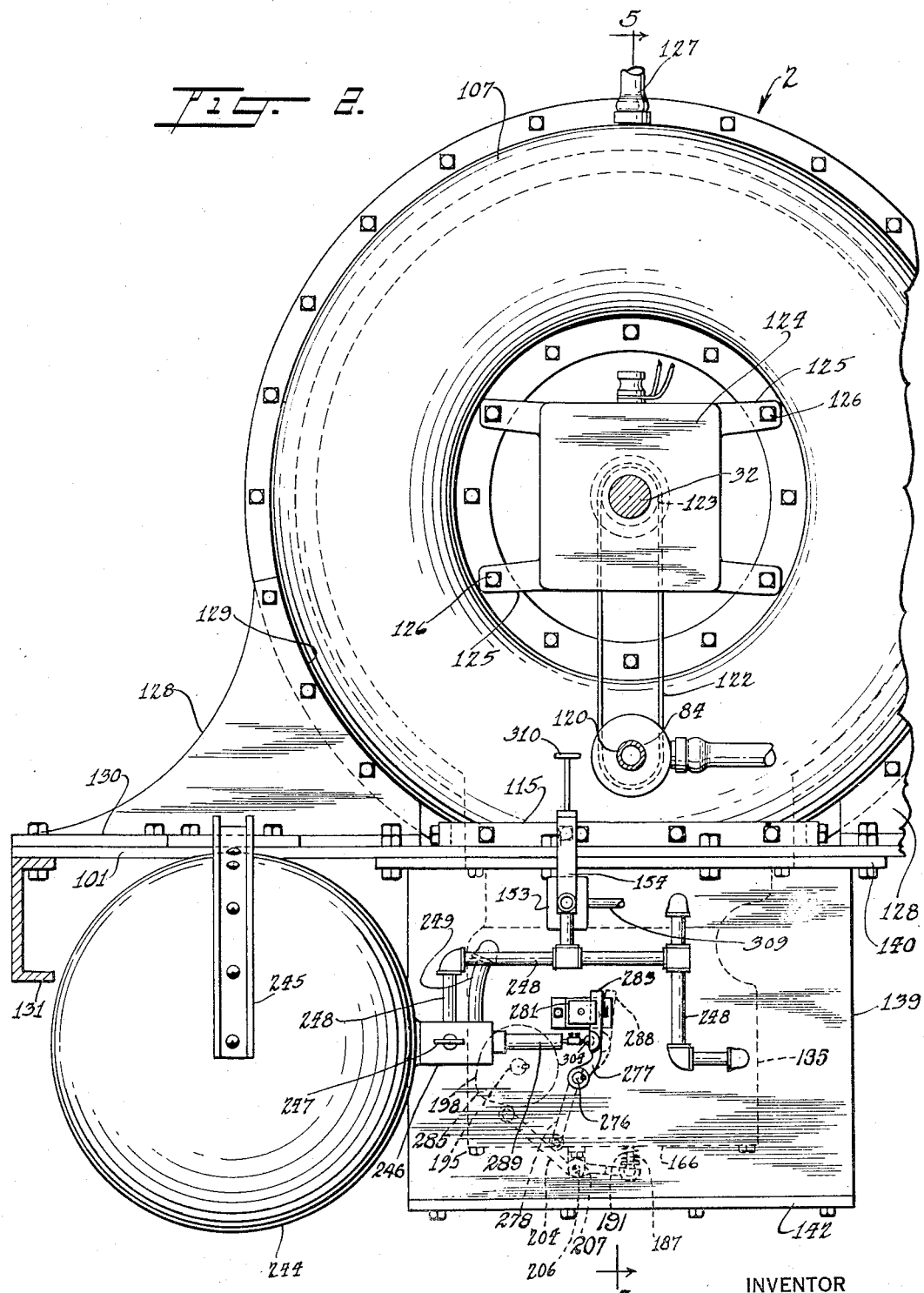

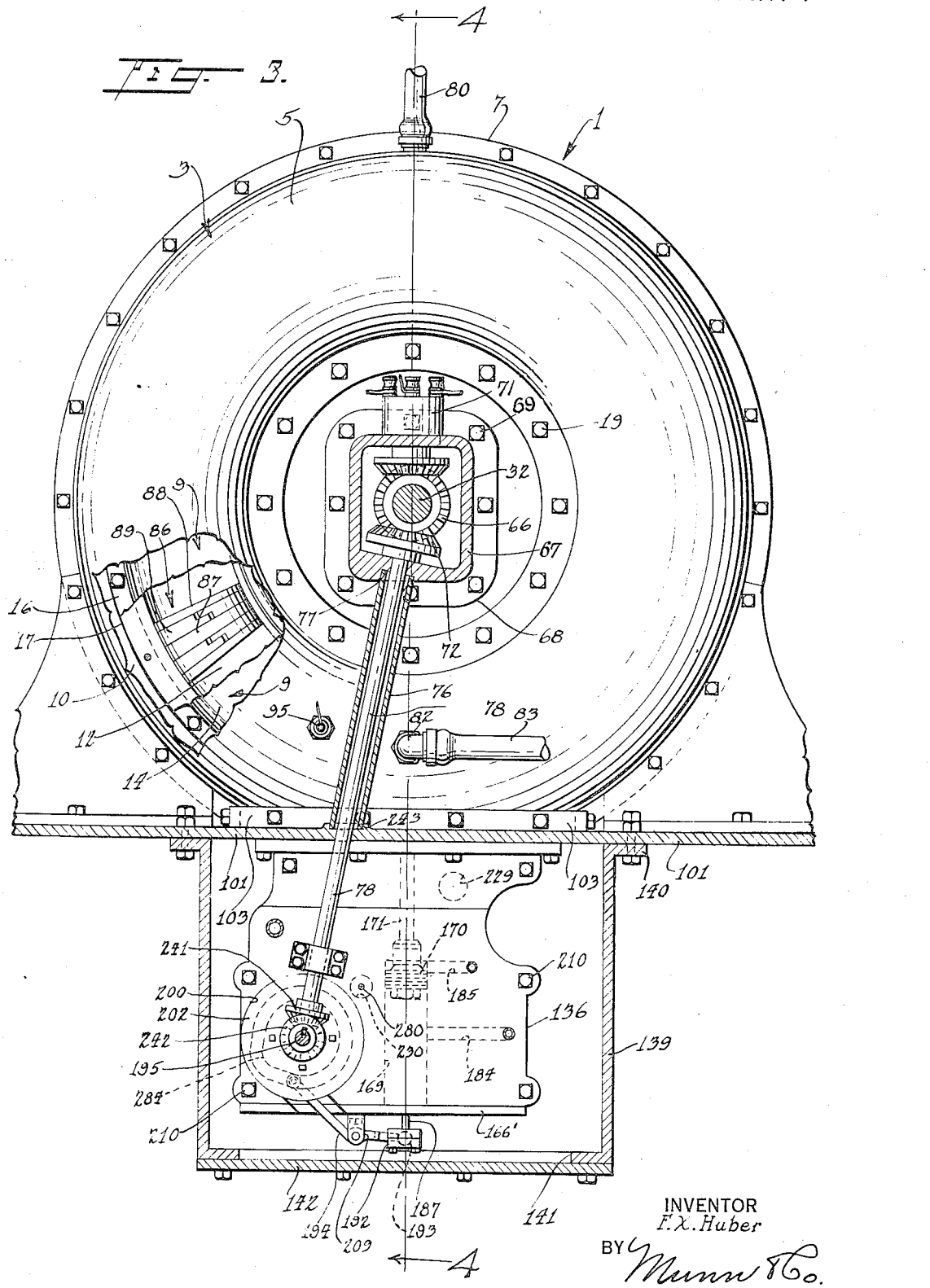

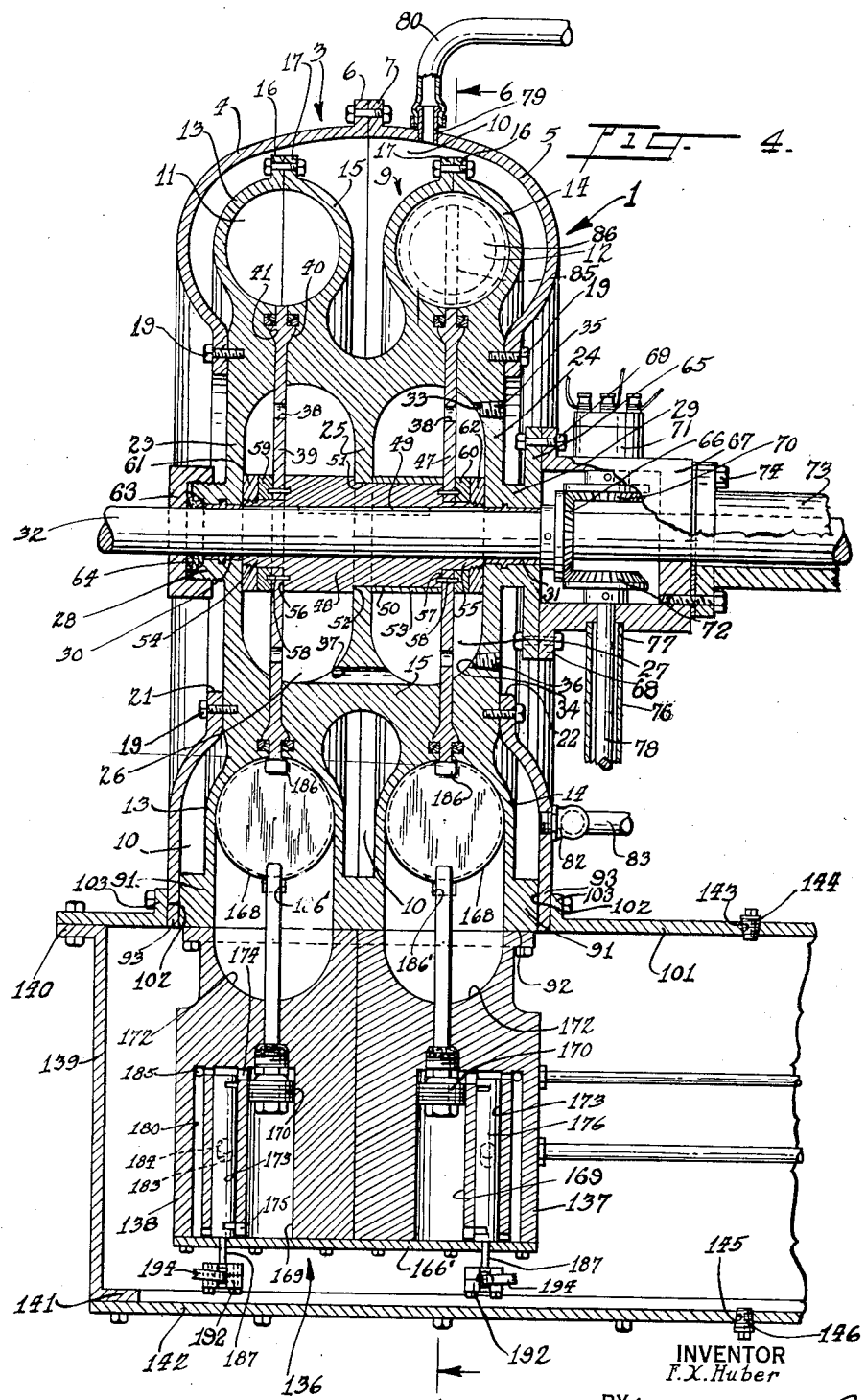

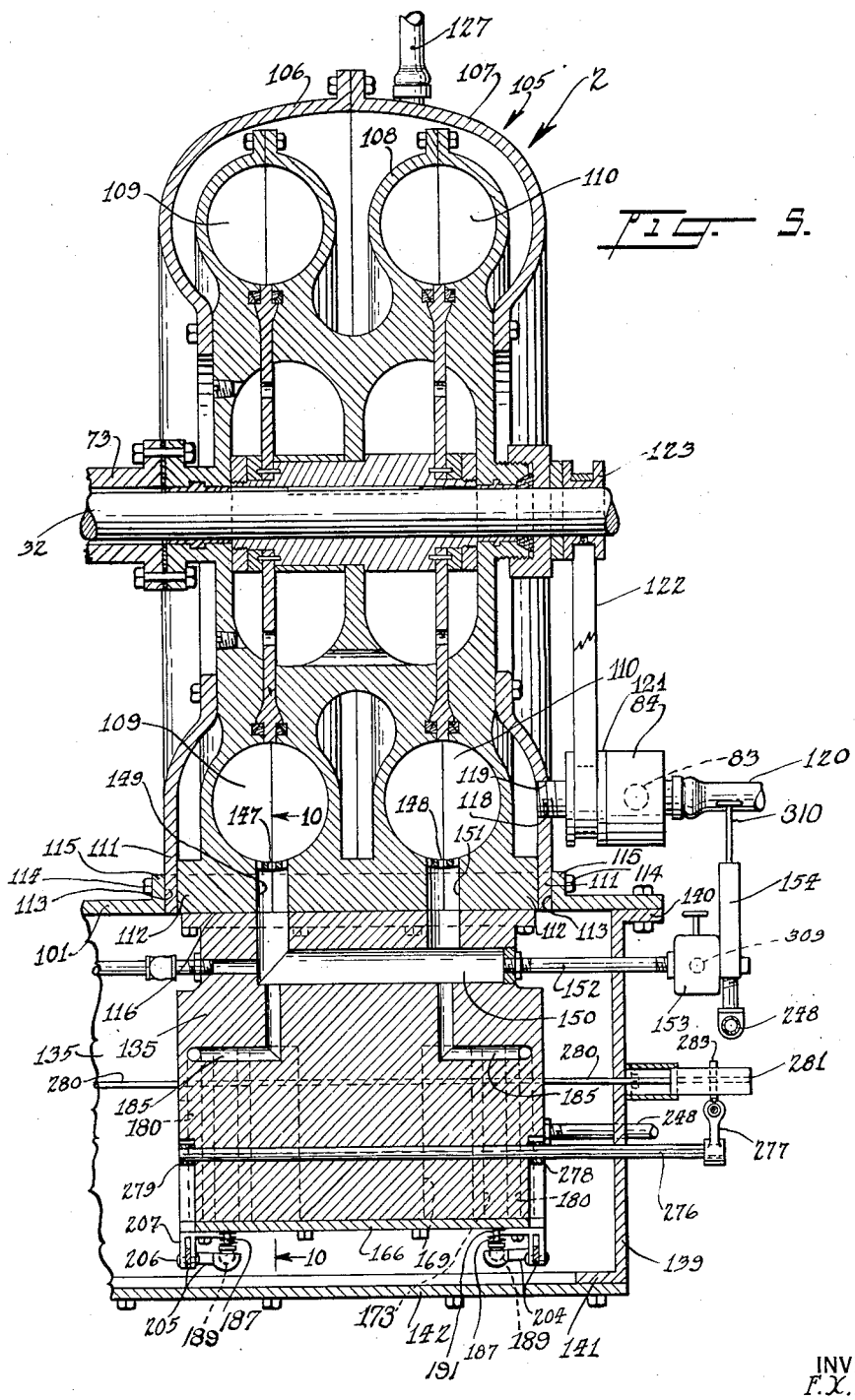

July 4, 1933.  F. X. HUBER  1,916,318
INTERNAL COMBUSTION ENGINE
Filed Aug. 23, 1930  11 Sheets-Sheet 6

INVENTOR
F. X. Huber
BY
Munn & Co.
ATTORNEYS

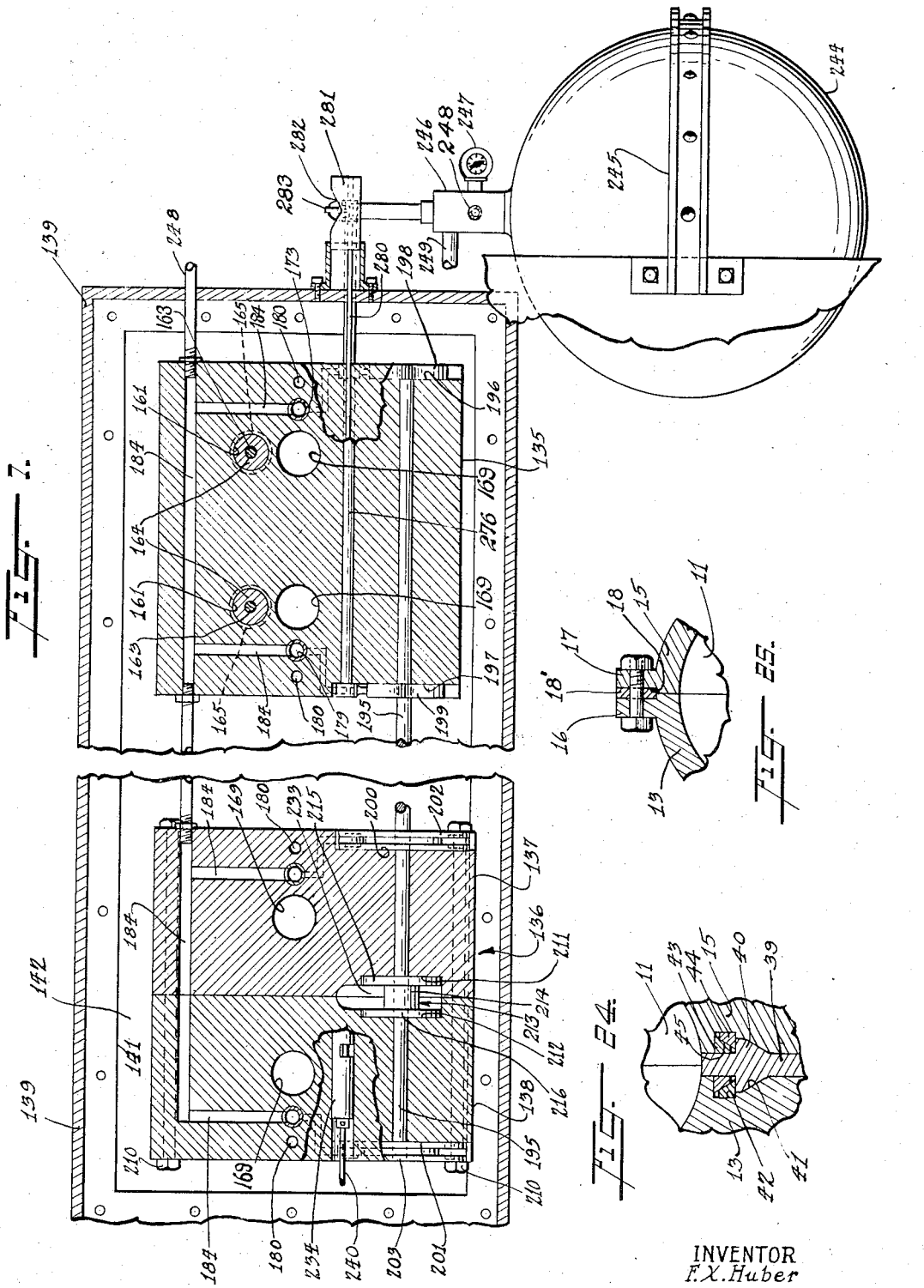

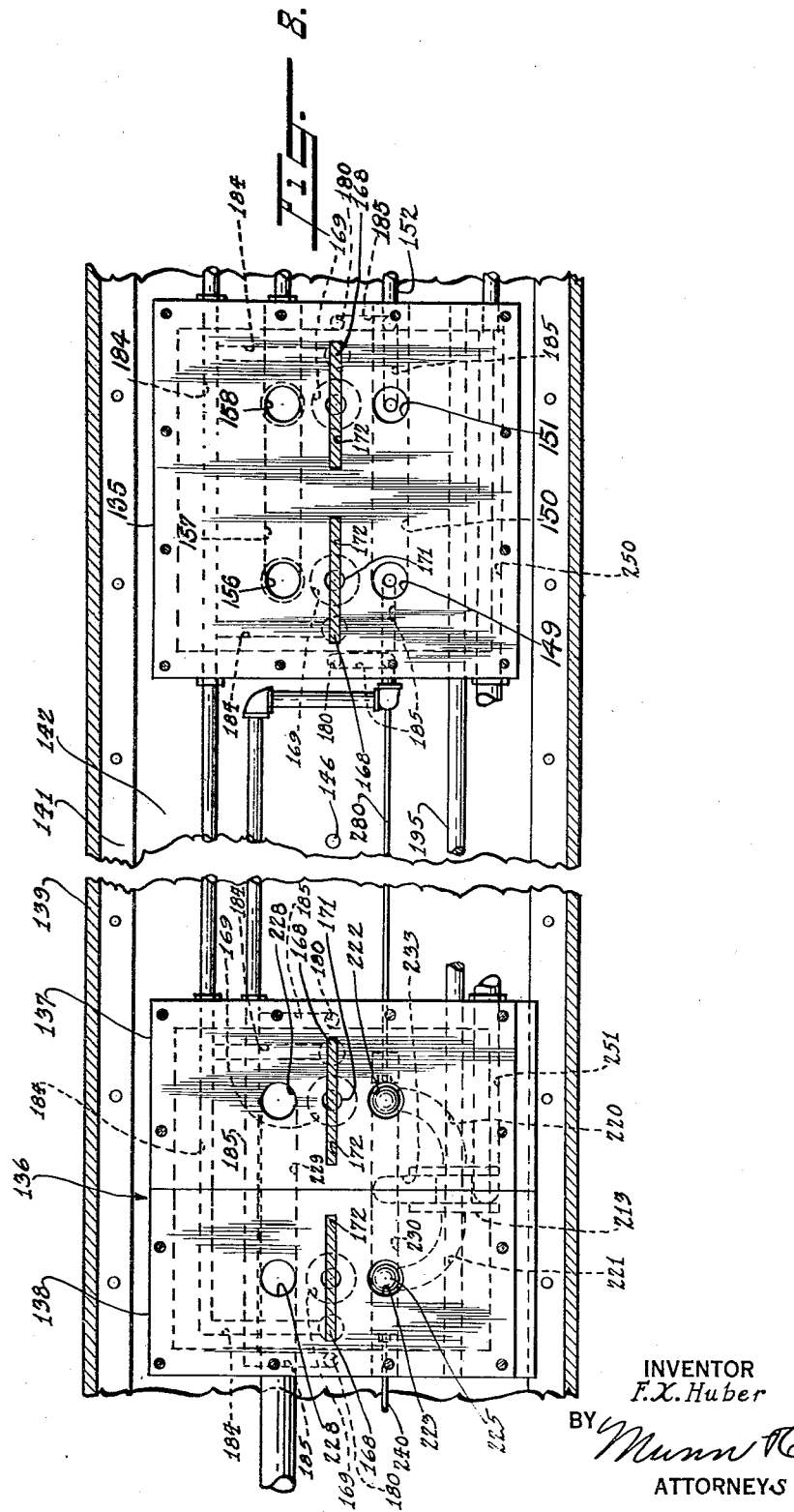

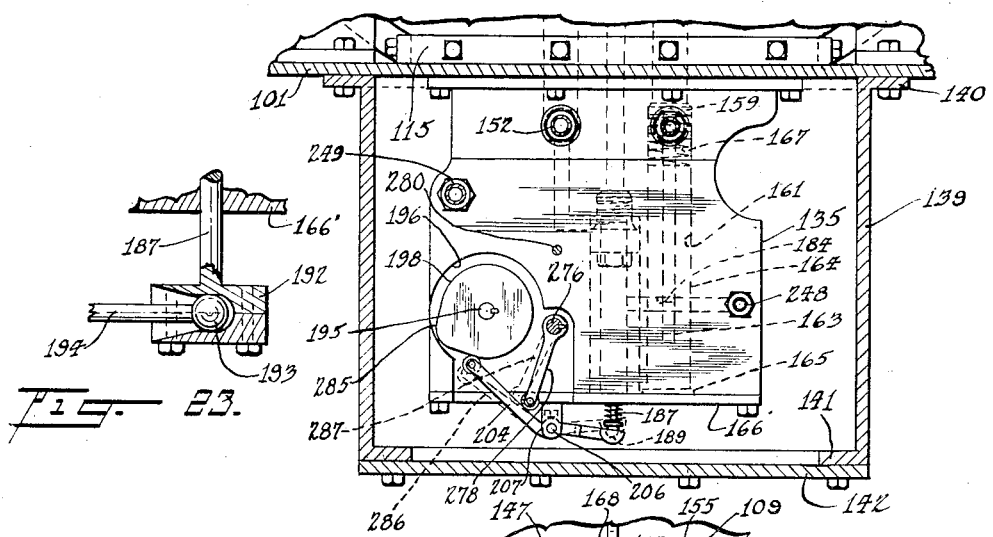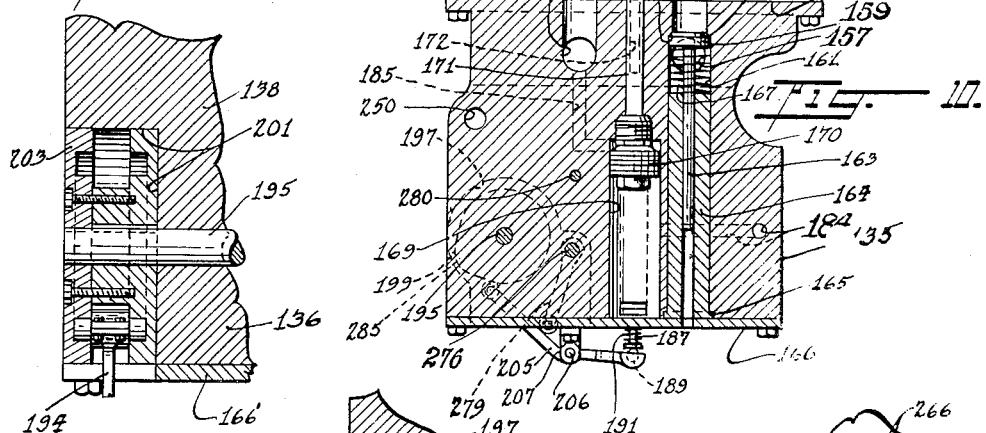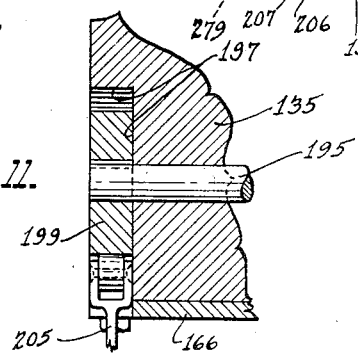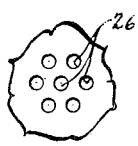

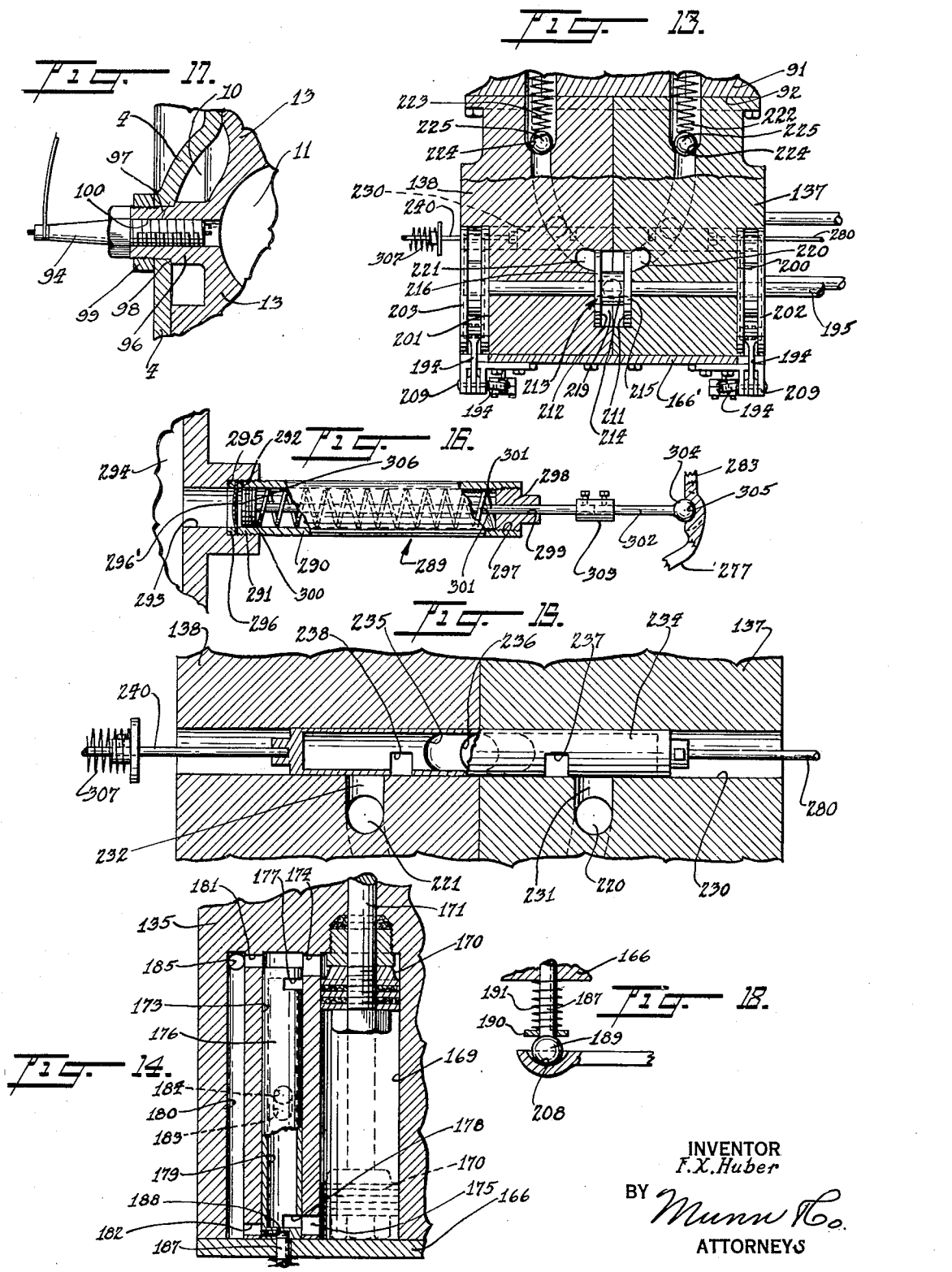

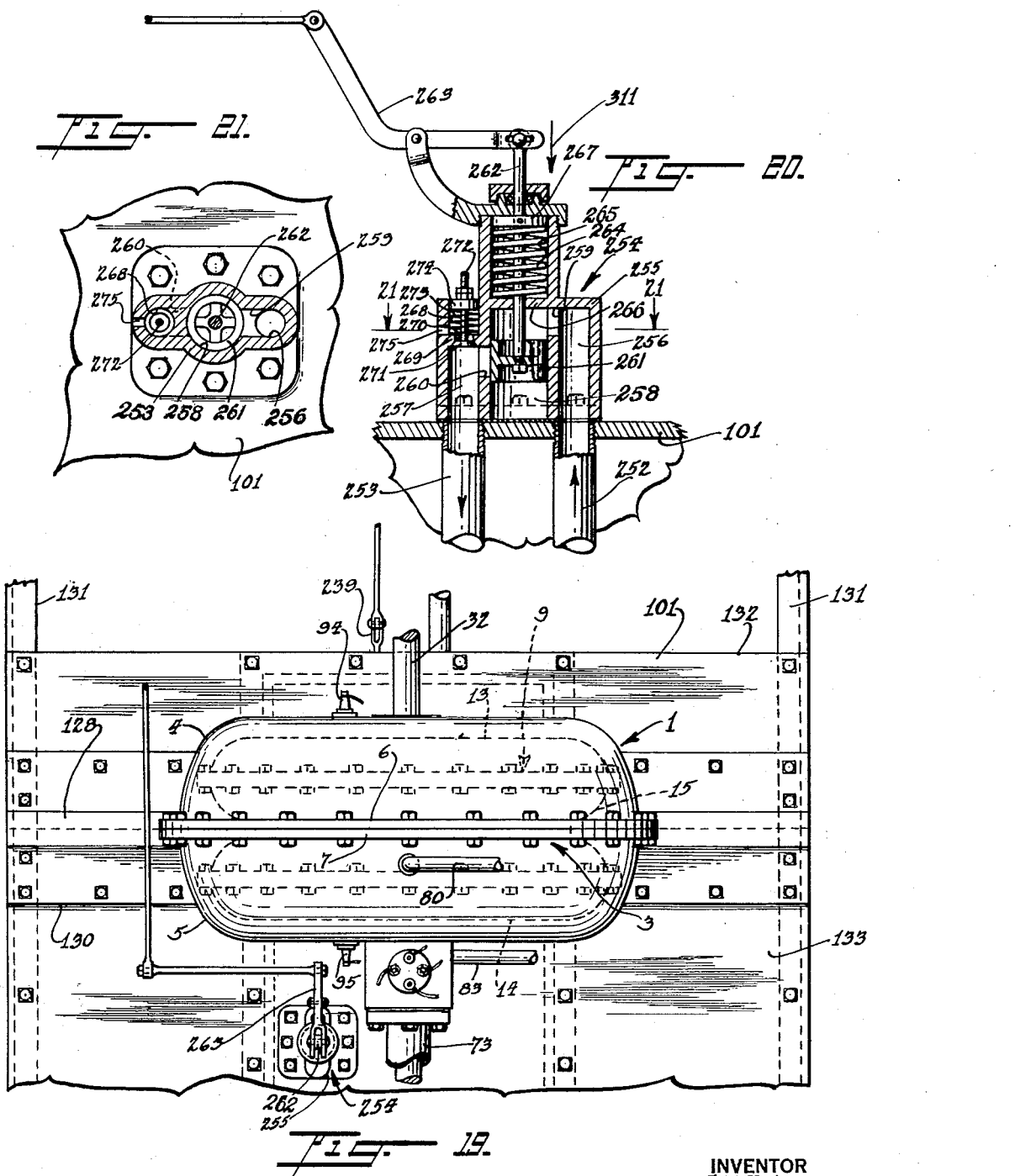

Patented July 4, 1933

1,916,318

UNITED STATES PATENT OFFICE

FRANK X. HUBER, OF GLIDDEN, WISCONSIN, ASSIGNOR OF ONE-EIGHTH TO OTTO H. ZIELKE AND ONE-EIGHTH TO EDWARD F. ZIELKE, BOTH OF GLIDDEN, WISCONSIN

INTERNAL COMBUSTION ENGINE

Application filed August 23, 1930. Serial No. 477,400.

My invention relates to improvements in internal combustion engines of the rotary type, and it consists in the combinations, constructions, and arrangements herein described and claimed.

An object of my invention is to provide an internal combustion engine of the rotary type which will efficiently use a low grade of fuel.

A further object is to provide an internal combustion engine which is practically free of vibration.

A further object is to provide a combustion engine which has no dead center, thereby eliminating a flywheel.

A further object is to provide a combustion engine which cannot reverse or back fire.

A further object is to provide a combustion engine in which the timing is permanently set and, therefore, not likely to get out of order.

A further object is to provide a combustion engine of the rotary type which has two explosions per revolution.

A further object is to provide a combustion engine having means for starting itself, thereby eliminating any special starting mechanism.

Other objects and advantages will appear in the following specification, and the novel features of the invention will be particularly pointed out in the appended claims.

My invention is illustrated in the accompanying drawings, forming part of this application, in which Figure 1 is a side elevation of my device, Figure 2 is a front elevation of my device with portions shown in section, Figure 3 is a section along the line 3—3 of Figure 1, with portions thereof broken away, Figure 4 is a vertical sectional view of a portion of my device taken substantially along the line 4—4 of Figure 3, Figure 5 is a vertical sectional view of a portion of my device taken substantially along the line 5—5 of Figure 2, Figure 6 is a section taken along the line 6—6 of Figure 4 with portions thereof broken away, Figure 7 is a horizontal sectional view of the valve casings of my device with portions thereof broken away and other portions shown in full, the greater part of the view being taken substantially along the line 7—7 of Figure 1, Figure 8 is a plan view of the valve casings apart from the engine with portions thereof shown in section, Figure 9 is a front elevation of the compressor valve casing with portions shown in section, Figure 10 is a vertical sectional view of the compressor valve casing taken along the line 10—10 of Figure 5, Figure 11 is an enlarged detail view of the cam mechanism in the compressor valve casing, Figure 12 is an enlarged detail view of the cam mechanism in the engine valve casing, Figure 13 is a longitudinal sectional view of the engine valve casing with a portion thereof broken away, Figure 14 is an enlarged detail sectional view of the valve mechanism for actuating the cylinder partitioning means in both the compressor and engine units, Figure 15 is a sectional view of a portion of the engine casing showing the engine starter valve, Figure 16 is a sectional view of the fuel pressure control valve, a portion thereof being shown in elevation, Figure 17 is an enlarged detail sectional view showing the construction of the engine casing at the spark plug connection, Figure 18 is an enlarged sectional view of the compressor cam lever arm in connection with the cylinder partition valve mechanism in the compressor unit, Figure 19 is a top plan view of the engine unit of my device, Figure 20 is an enlarged sectional detail view of the fuel control mechanism of the engine unit, Figure 21 is a section taken along the line 21—21 of Figure 20, Figure 22 is a detail view of the gas inlet and outlet openings in both the compressor and engine cylinder walls shown in Figures 2 and 10, Figure 23 is an enlarged sectional view of the engine cam lever arm in connection with the cylinder partition valve mechanism in the engine unit, Figure 24 is an enlarged sectional detail view of the annular compression rings in the cylinder chamber casings, and Figure 25 is a sectional view showing a waterproof cylinder construction.

In carrying out my invention I provide a combustion or engine unit 1 and a fuel compressing unit 2. The engine unit 1 comprises a body portion or jacket 3 which is substantially annular in cross section, as shown in Figure 6. The jacket 3 consists of two portions 4 and 5 which have outwardly extending flanges 6 and 7, respectively, see Figure 4. The flanges 6 and 7 are adapted to be bolted together thereby making the portions 4 and 5 into a single unit, which is the jacket 3.

A combination chamber casing or cylinder casing 9 is disposed within a water compartment 10, formed by the jacket 3, and is substantially annular in cross section. The combustion chamber casing is in axial alignment and concentric with the body portion 3. The cylinder casing 9 encloses two annular combustion chambers or cylinders 11 and 12, and consists of end portions 13 and 14 and a center portion 15. The end casing portions 13 and 14 are provided with outwardly extending flanges 16, and the center portion 15 is provided with outwardly extending flanges 17. All of the flanges 16 and 17 conform to the substantially annular contour of the cylinder casing 9, as shown in Figure 6.

The abutting faces of the flanges 16 and 17 may be recessed at 18 for receiving a gasket 18', whereby the cylinders may be made water-tight, see Figure 25. The body portion 3 is securely fastened to the end portions 13 and 14 of the cylinder casing 9 by any suitable means such as bolts 19. Packing may be provided between the body portion 3 and the casing portions 13 and 14 for providing a leak-proof connection. The jacket portions 4 and 5 are provided with nular flanges 23, 24, and 25, respectively, The cylinder casing portions 13, 14, and 15 are provided with inwardly extending annular flanges 23, 24, and 25, respectively, which provide oil compartments 26 and 27. The inwardly extending flanges 23 and 24 are provided with annular projecting flanges 28 and 29, respectively. The flanges 23 and 24 have annular openings provided with bearings 30 and 31 for receiving a shaft 32 in axial alignment and concentric with the circular cylinders 11 and 12.

The flange 24 of the casing portion 14 is provided with threaded openings 33 and 34 in communication with the compartment 27. The opening 33 is for the purpose of filling the compartments 26 and 27 with oil, and the opening 34 is for the purpose of draining the oil from said compartments. The openings 33 and 34 are provided with threaded plugs 35 and 36 for closing the openings when they are not in use. The flange 25 is provided with a passageway 37 in communication with the compartments 26 and 27 whereby oil contained in the compartments may flow therebetween.

An annular plate 39 is disposed between the casing portions 13 and 15, and is concentric with the shaft 32. The periphery of the annular plate conforms to the innermost circumference of the cylinder 11. The plate 39 is provided with annular projecting flanges 40 which are receivable in complementary annular recesses 41 of the casing portions 13 and 15. The casing portions 13 and 15 are provided with annular recesses 42 which are angular in cross section and adjoin the recesses 41. The annular recesses 42 each contain a pair of annular rings 43 and 44. The annular rings have beveled edges 45 engaging each other, and are cut at 46 so as to overlap in order that the circumference of the rings may increase or decrease without leaking. The annular rings 43 and 44 abut the flanges 40 and prevent any communication between the cylinder 11 and the compartment 26. An annular plate 47, similar to the plate 39, is disposed between the casing portions 14 and 15, and has annular projecting flanges and compression rings associated therewith in the same manner as the annular plate 39. The annular plates 39 and 47 are provided with openings 38 therethrough whereby oil contained in the compartments may freely circulate therein and therebetween.

An elongated collar 48 is disposed concentrically on the shaft 32 between the flanges 23 and 24. The collar 48 and the shaft 32 are provided with keyways adapted to contain a key 49 in order that the collar will rotate with the shaft. The collar 48 has a slightly reduced portion 50 which is disposed in an annular opening 51 in the flange 25 and provides shoulder 52 abutting the flange 25 of the casing portion 15. An annular band 53 is disposed on the reduced portion 50 between the flange 25 and the annular plate 47. The keyway in the collar 48 is tapered so that when the unit 1 is disassembled, the portions 4, 5, 13, 14, and 15 may be driven off the shaft without the key moving from its position in the key slot in the shaft.

The end portions 54 and 55 of the collar 48 are of reduced diameters which provide shoulders 56 and 57. The annular plate 39 is disposed on the reduced portion 54 and abuts the shoulder 56. In like manner the annular plate 47 is disposed upon the reduced portion 55 and abuts the shoulder 57. The plates 39 and 47 are provided with openings for receiving pins 58, one end of said pins being engaged in recesses in the shoulders 56 and 57 of the elongated collar 48, and the other end of said pins being disposed in recesses in collars 59 and 60 disposed on the reduced portions 54 and 55, respectively, of the elongated collar 48. The ends of the reduced portions 54 and 55 are threaded for receiving internally threaded collars 61 and 62, respectively. The collars 61 and 62 are screwed on the threaded reduced portions of the flange 48, thereby securely fastening the plates 39 and 47 to the shaft 32 so that the plates will rotate with the shaft. This construction is not only for assembly purposes, but also provides means for securely holding the annular plates in their proper positions and in positive locking connection with the shaft.

The external portion of the flange 28 is threaded for receiving an internally threaded member 63 which is concentric with the shaft 32 and through which the shaft passes. The end of the annular flange 28 is provided with a beveled annular recess adjacent the shaft for receiving packing 64. The extending flange 29 is provided with an outwardly extending flange 65. A beveled gear 66 is fixedly secured to the shaft 32. A casing or gear housing 67 is provided with flanges 68 which are adapted to be secured to the flange 65 by any suitable means such as bolts 69. A beveled gear 70 is disposed within the housing on the upper side thereof and is in mesh with the beveled gear 66. The beveled gear 70 is in operative engagement with a standard ignition timing mechanism 71 disposed on the upper side of the housing 67. A beveled gear 72 is in mesh with the beveled gear 66 and is disposed within and on the lower side of the casing 67. A shaft housing 73 is provided for the shaft 32 and has one end connected with the gear housing by means of bolts 74 and the other end connected with the compressing unit.

A shaft housing 76 has one end contained in a recess 77 of the housing 67 and is adapted to enclose a shaft 78 to which the beveled gear 72 is connected. The jacket 3 is provided with a threaded opening for receiving a hollow plug 79. A hose 80 has one end connected to the plug and the other end connected to a radiator 81, see Figure 1. The hose 80 is the means for carrying water from the compartment 10, within the jacket 3, to the radiator. The jacket 3 is provided with another threaded opening for receiving a hose connection 82 having a hose 83 attached thereto.

The hose 83 is connected to a pump 84 which is the means for pumping the water contained in the radiator 81 to the compartment 10. The annular plate 47 is provided with an extending portion 85 projecting into the cylinder 12, see Figure 6. This projection 85 is the means for attaching a piston 86 to the plate 47, see Figure 3. Referring again to Figure 6, it will be noted that the piston comprises a cylindrical member 87 of substantially the same diameter as that of the cross section of the combustion chamber 12. One end of the cylindrical member 87 is open and the other is covered by a plate 88 of the same diameter as the cylindrical member and integral therewith. The member 87 is provided with recesses, and the projection 85 has openings for receiving piston rings 89. The member 87 and the piston rings 89 conform at all points to the circumference arc of the combustion chamber 12.

A piston 90 is disposed in the cylinder 11 and is attached to the annular plate 39 in the same manner in which the piston 86 is attached to the plate 47. The piston 90 is diametrically opposed to the piston 86. The lower portion of the cylinder casing 9, composed of the portions 13, 14, and 15, forms a rectangular shaped base 91, as shown in Figures 4 and 6, and presents a flat surface or face 92 on its lower side. The body portion or jacket 3 assumes a rectangular shape where it engages the base 91 of the cylinder casing 9, and is provided with flanges 93 for being secured to the base 91. As shown in Figure 1, the combustion chambers 11 and 12 are provided with spark plugs 94 and 95, respectively, for igniting the fuel in the combustion chambers. As shown in Figure 3, the spark plugs are disposed to one side of the vertical center line of the unit 1.

Figure 17 shows the spark plug construction in connection with the combustion chambers. The combustion chamber casing 13 is provided with an annular projection 96 having a reduced portion 97 projecting through an annular opening in the jacket portion 4. The reduced portion provides an annular shoulder 98 abutting the jacket portion 4. The annular reduced portion is threaded externally at its end and is provided with an internally threaded nut 99 for providing a leak-proof connection between the projection 96 and the jacket portion 4. The annular projection 96 has a threaded portion 100 in communication with the combustion chamber 11 which is adapted to receive the spark plug 94. The combustion chamber casing portion 14 and the jacket portion 5 have the same construction for receiving the spark plug 95 in connection with the combustion chamber 12.

A base plate 101 is provided with a rectangular opening 102 for receiving the rectangularly shaped base flanges 93 of the body portion 3 enclosing the rectangularly shaped base 91 of the cylinder casing 9. The base plate 101 is provided with upwardly extending flanges 103 about the rectangular opening; the inner faces of the flanges 103 providing the edges of the rectangular opening 102. The rectangular shaped base 91 of the cylinder casing, the base flanges 93 of the body portion 3, and the flanges 103 of the base plate 101 are adapted to be securely fastened together by bolts. Packing may be provided between the rectangular base 91 of the combustion chamber casing 9 and the jacket casing 3 for providing a seal-tight connection.

Let us now refer to the fuel compressing unit 2 shown in Figure 1. Thus far the structure of the compressing unit is almost identical to that described for the combustion unit 1. The compressing unit comprises a casing or jacket 105 similar to the casing 3 of the combustion unit. The casing 105 is composed of two casing portions 106 and 107. A cylinder casing 108 is disposed within the jacket 105 and is identical to the cylinder casing construction 9 of the combustion unit 1 except for the construction for receiving the spark plug. The compressing unit 2 is in axial alignment with the combustion unit 1. The shaft 32 extends through the compressing unit, which is concentric with the shaft, and has means associated therewith in exactly the same manner as in the combustion unit for rotating diametrically opposed pistons in the cylinders 109 and 110, respectively. The casing 105 and the cylinder casing 108 assume a rectangular shape at their bases 111 and 112, respectively, exactly the same as the body portion 5 and the cylinder casing 9 of the combustion unit 1, and are disposed in a rectangular opening 113 of the base plate 101 to which they are securely fastened by bolts 114 through upwardly extending flanges 115 integral with the plate 101 and having their faces on the rectangular plane 116 similar to that of the face 92 of the combustion unit base 91.

The shaft extends beyond the front of the compressing unit 2 and has a fan blade 117 securely fastened thereto for drawing air through the radiator 81 for cooling the water contained therein. The water pump 84 has a hollow threaded projection 118 disposed in a threaded opening 119 of the water jacket 105. The other end of the pump 84 is provided with means for attaching a hose 120, said hose having its other end connected to the radiator 81.

The pipe 83, leading to the water compartment of the combustion unit, is attached to the pump 84 as shown in dotted lines in Figure 5. The pump 84 is provided with an actuating pulley 121 which is rotated by a belt 122 around a collar 123 rigidly secured to the shaft 32.

An electric generator 124 is disposed on the shaft 32 and is operatively connected thereto. The generator is supported by legs 125 which are secured to the casing 105 by means of bolts 126 used for connecting the casing 105 to the cylinder casing 108. The jacket 105 is provided with means for attaching a pipe 127 in the same manner that the pipe 80 is attached to the jacket 5 of the combustion unit. The pipe 127 is in communication with the pipe 80 which leads to the radiator 81. The pump 84 is a positive means for circulating the water through the combustion and compressing units.

As shown in Figures 1 and 2, upright rib or supporting plates 128 are disposed upon the base 101 and have an arcuate-shaped edge 129 conforming to the exterior circumference arc of the water jacket. These rib plates are recessed for receiving the flanges of the water jacket and are rigidly secured to the flanges by means of bolts for fastening the flanges together. The upright rib plates are provided with laterally extending base portions 130 and are provided with means for being rigidly secured to the base plate 101. Both the upright rib plates 128 and the base plate 101 extend over the top of a vehicle frame 131 and are securely fastened thereto by any suitable means such as bolts. The supporting plates are attached to each side of the compressing unit and the combustion unit in the manner shown in Figure 2, and are the means for supporting the compressing unit and the combustion unit with respect to the vehicle frame.

The base plate 101 is divided into three portions 132, 133, and 134 for purposes of assembly, see Figure 1. As shown in Figure 5, a valve housing 135 is attached to the face 116 of the cylinder casing base 112 of the compressing unit 2, and in like manner a valve housing 136, composed of two portions 137 and 138, is attached to the face 92 of the combustion cylinder casing base 91 of the combustion unit 1.

As shown in Figure 4, a casing 139 is disposed on the under-side of the base plate 101 and has an outwardly extending flange 140 by which means it is secured to the base plate 101. The casing 139 has an inwardly extending flange 141. A cover plate 142 is securely fastened to the flange 141 of the casing 139. The flanges 140 and 141 extend all the way around the casing 139 which is rectangular in cross section. The casing 139, together with the base plate 101 and the cover plate 142, completely encases the valve housings 135 and 136. The base plate 101 is provided with a threaded opening 143 for receiving a threaded plug 144. The cover plate 142 is provided with a threaded opening 145 for receiving a threaded plug 146. The opening 143 is for the purpose of filling the casing 139 with oil and the opening 145 is for the purpose of draining the oil from the casing.

In referring again to the compressing unit shown in Figure 5, it will be seen that the walls of the cylinders 109 and 110 adjacent the base portion 112, are provided with a group of perforations 147 and 148, respectively. The perforations 147 are in communication with a fuel passageway 149 disposed in the base portion 112 and the valve housing 135. The fuel passageway 149 is in communication with a main fuel inlet passageway 150. The perforations 148 are in communication with a passageway 151 similar to the passageway 149 and leading to the main passageway 150.

A pipe 152 has one end in communication with the main fuel passageway 150. The pipe 152 projects through the wall of the casing 139 and has its opposite end in communication with a carburetor 153 outside of the casing 139. The carburetor has a hand pump 154 associated therewith for a purpose hereinafter described.

In referring to Figure 10 it will be seen that the wall of the cylinder 109, adjacent the base 112, is provided with another group of perforations 155 which are in communication with a compressed fuel outlet passageway 156 disposed in the base portion 112 and the valve housing 135. The fuel outlet passageway 156 is in communication with a main compressed fuel outlet passageway 157, see Figure 8. In like manner the cylinder 110 has a group of perforations in communication with a compressed fuel outlet passageway 158 in communication with the main fuel outlet passageway 157. The passageways 156 and 158 are provided with slidable valves 159, disposed within the housing 135, for opening and closing their communication with the main fuel outlet passageway 157.

For clarity, the description of the construction of the valves 159 will be confined to one valve. The valve 159 comprises a valve head 160 disposed in a cylindrical passageway 161 which is of larger diameter than and concentric with the passageway 156. The juncture of the walls of the passageway 156 with the walls of the passageway 161 is beveled, providing a valve seat 162 for the valve head 159. The valve seat 162 is above the compressed fuel passageway 157 so that when the valve 159 is seated, there is no communication between the passageways 156 and 157. The valve head 159 is provided with a valve stem 163 which is slidably disposed in a hollow cylindrical member 164 contained in the cylindrical passageway 161. The cylinder 164 is provided with an annular extending flange 165 for positioning it in the passageway 161. The valve housing 135 has a base plate 166 attached to its lower side which serves to keep the cylindrical member 164 in position. The valve head 159 is properly seated by means of a spring 167 disposed between the valve head and the cylindrical member 164.

The valve housing 135 of the compressing unit, see Figure 10, and the valve housing 136 of the engine unit, see Figure 4, are each provided with valve means for projecting a partitioning plate 168 into the cylinders 11 and 12 of the engine unit, and 109 and 110 of the compressing unit, and also for withdrawing the partitioning plate from said cylinders.

For purposes of clarity, the description of the valve construction will be confined to the means for actuating the partitioning plate of the cylinder 109. As shown in Figure 10, the valve housing is provided with a cylindrical piston chamber 169 which is provided with a slidable piston 170 contained therein. A piston stem 171, slidably disposed in the base portion 112 and the valve housing 135, has one end connected to the piston 170 and the other end connected to the annular partitioning plate 168. The plate 168 is adapted to slide into and out of the cylinder 109. When the partitioning plate 168 is withdrawn from the cylinder 109, it is disposed in a recess 172 contained in the base portion 112 and the valve housing 135. As shown in Figure 14, a cylindrical valve chamber 173 is disposed in the housing 135 adjacent the chamber 169. A passageway 174 provides communication between the upper ends of the chambers 173 and 169, and a passageway 175 provides communication between the lower ends of the chambers 173 and 169. A hollow valve tube 176, having closed ends, is slidably mounted in the cylindrical valve chamber 173 and has openings 177 and 178 adjacent its top and bottom ends, respectively. The opening 177 provides communication between a passageway 179 of the tube 176 and the passageway 174, and the opening 178 provides communication between the passageway 179 and the passageway 175. A passageway 180 is disposed adjacent the cylindrical valve chamber 173 and is in communication with the top and bottom ends of the valve chamber 173 by means of openings 181 and 182, respectively.

When the valve 176 is down as shown in Figure 14, an inlet passageway 184 is in communication with the lower extremity of the cylindrical piston chamber 169 via the passageway 179, the opening 178, and the passageway 175. The upper extremity of the cylindrical piston chamber 169 is in direct communication with an outlet passageway 185 via the passageway 174, the valve chamber 173, and the opening 181. When the valve 176 is moved up, the passageway 184 is in communication with the upper extremity of the opening 168 via the opening 177 and the passageway 174. The lower extremity of the passageway 168 is in direct communication with the passageway 180 via the passageway 175, the cylindrical valve chamber 173, and the opening 182.

The passageway 180, the cylindrical valve chamber 173, and the cylindrical piston chamber 169 have their lower ends sealed by means of the base plate 166 in the compressor valve housing 135 and 166' of the engine valve housing 136. The tube 176 is provided with an elongated opening 183, in its side, which provides communication between the passageway 179 of the tube 176 and a fuel supply passageway 184 which is in communication with a compressed fuel tank 244 regardless of the sliding position of the tube 176. The passageway 180 is in communication with a fuel outlet which in turn is in communication with the fuel passageway 150 of the compressor valve housing 136, see Figure 8. Thus it will be seen that the valve means for actuating the partitioning plates are actuated by the compressed fuel vapor.

In referring to Figure 6 it will be observed that the partitioning plates 168 are each provided with a shoe 186 at the point which contacts with the rotating piston plates at the inner circumference of the cylinders. These shoes are arcuate-shaped at their points of contact with the rotating piston plates and conform to the arc of the innermost circumference of the cylinders. The walls of the cylinders adjoining the piston stems 171 are provided with recesses 186' for receiving the shoes 186 when the partitioning plates 168 are withdrawn from the cylinders for permitting the pistons to pass by. The shoes are for the purpose of preventing fuel leakage between the shoes 186 and the rotating piston plates, and in the engine also serve to prevent burning between the partitioning plates 168 and the rotating piston plates.

The sliding valve tubes 176 are provided with valve rods 187 securely fastened to their lower ends at 188 and slidable in the base plates 166 and 166'. The valve rods are keyed in the base plates, as shown in Figure 14, for preventing the rotation of the valve tubes 176.

As shown in Figure 18, each of the sliding valve rods 187, in connection with the sliding valves 176 contained in the compressor valve housing 135, has a spherical-shaped end 189. A washer 190 is disposed on the end 189 of the valve rod. A coil spring 191 is disposed on the sliding rod 187 and the base plate 166. As shown in Figure 23, each of the sliding valve rods 187, in connection with the sliding valves 176 contained in the engine unit valve casing 136, is provided with a split block-shaped end 192 having a socket for containing the ball-shaped end 193 of an engine cam lever 194. A valve actuating shaft 195 is disposed in the compressor valve housing 135 and the engine valve housing 136 and extends from the extreme end of the compressor valve housing to the extreme end of the engine valve housing.

As shown in Figure 7, the compressor valve housing 135 is recessed at 196 and 197 for receiving cam plates 198 and 199, respectively, which are rigidly fastened to the shaft 195. As shown in Figures 7 and 13, the extreme ends of the engine valve housing 136 are recessed at 200 and 201 for receiving grooved cams 202 and 203, respectively. Figures 9 and 10 show compressor cam levers 204 and 205 pivotally mounted at 206 to lever supporting members 207 attached to the base plate 166. One end of the cam levers 204 and 205 is in operative engagement with the cam plates 198 and 199, respectively, and the other ends are provided with arcuate-shaped recesses 208 for receiving the spherical-shaped ends 189 of the valve rods 187, which are connected to the sliding cylinder valves 176 contained in the valve housing 135, see Figure 18.

Figures 3 and 13 show the engine cam levers 194 pivotally mounted to lever supporting members 209 attached to the base plate 166' of the engine valve housing. One end of the engine cam levers is in operative engagement with the engine cams, and the other ends are movably connected to the sliding rods 187 of the sliding cylinder valves 176 disposed within the engine valve housing 136 as shown in Figure 23.

As heretofore stated, the engine valve housing 136 is composed of two portions 137 and 138. The portions 137 and 138 are held together by bolts 210 extending longitudinally therethrough, the base plate 166', and the rectangular base 91 of the combustion chamber casing 9. As shown in Figure 13, the portions 137 and 138 are each provided with an internal recess 211 and 212, respectively, for containing a spool valve 213 disposed on the shaft 195. The spool valve 213 has a reduced diameter 214 providing annular flanges 215 and 216.

As shown in Figure 6, the flanges 215 and 216 of the spool valve 213 are provided with openings 217 and 218, respectively. The openings 217 and 218 are arranged to provide periodic communication between an opening 219, disposed between the spool valve flanges 215 and 216, and their respective passageways 220 and 221, which lead to enlarged passageways 222 and 223, respectively, in communication with the respective cylinder chambers 12 and 11. The juncture of the walls of the passageways 220 and 221 with the walls of the enlarged passageways 222 and 223 respectively, provides valve seats 224 for receiving ball valves 225. The walls of the cylinder chambers 11 and 12 are each provided with a group of perforations 226 in communication with their respective passageways 223 and 222.

The vaporized fuel enters the combustion chamber 11 via the passageways 221, 223, and the perforations 226, and in like manner the vaporized fuel enters the cylinder chamber 12 by way of the passageways 220, 222, and its perforations 226. Each of the cylinder chambers 11 and 12 is provided with a group of perforations 227 which are in communication with an exhaust passageway 228. The exhaust passageway 228 leads to a main exhaust passageway 229. These exhaust passageways are for the purpose of carrying off the products of combustion.

The engine valve housing 136 is provided with a valve passageway 230 in communication with the passageways 220 and 221 by means of openings 231 and 232. The passageway 230 is also in communication with a passageway 233 leading to the opening 219 between the spool valve flanges 215 and 216. A tubular valve or starter tube 234, having closed ends, is slidably disposed in the valve passageway 230. The tubular valve 234 is slotted at 235 so that the orifice 236 of the passageway 233 is in constant communication with the interior of the tubular valve 234.

The tubular valve is provided with openings 237 and 238 adapted to provide communication between the interior of the tubular valve 234 and the respective passageways 231 and 232 according as the sliding valve is moved. One end of the sliding valve 234 is connected to an actuating lever 239 by means of a connecting member 240. Thus it will be seen that the fuel may be admitted to either of the passageways 220 or 221 from the opening 219 when the tubular valve 234 is actuated, without necessitating the passage of the fuel through the respective openings 217 or 218 in the flanges of the spool valve 213. The sliding tubular valve 234 also acts as a starter valve, the operation thereof being hereinafter described.

Referring again to the shaft 78 shown in Figures 1 and 3, it will be seen that the shaft passes through an opening in the base plate 101 and is provided with a beveled gear 241 connected to its lower end. A beveled gear 242 is fixedly mounted upon the shaft 195 and in mesh with the gear 241. The spool valve, the cam plates and their associated mechanisms are actuated by the rotation of the main shaft 32 through the mediums of the shaft 78, the shaft 195, and their associated beveled gears. As shown in Figure 3, the lower end of the shaft housing 76 is held in place by means of an annular raised flange 243 integral with the base 101.

Referring to Figure 2, it will be seen that the spherical pressure tank 244 is provided for storing the compressed vaporized-fuel which is compressed by the compressor unit 2. The pressure tank is supported by a supporting member 245 secured to the base plate 101.

A hollow junction 246 is attached to the compression tank 244, the interior of which is in communication with the interior of the tank. The junction is provided with a pressure-indicating means 247 for showing the pressure of the vaporized-fuel contained within the tank at all times. As seen in Figure 2, the interior of the junction 246 is in communication with the fuel pump 154, the main fuel outlet passageway 157 in the compressor valve housing, see Figures 8 and 10, and the passageways 184 of both the compressor valve housing and the engine valve housing, see Figure 7, by means of a pipe 248.

As shown in Figure 1, the interior of the junction 246 is in communication with the opening 219 of the engine valve casing via a pipe 249, a passageway 250 within the compressor valve housing, a passageway 251 within the engine valve housing, pipes 252 and 253, and a throttle valve means 254 in communication with the pipes 252 and 253, said throttle valve being for the purpose of controlling the volume of the vaporized-fuel passing from the pressure tank 244 to the opening 219.

The valve means 254, see Figure 20, comprises a body portion 255 having a compressed vaporized-fuel inlet passageway 256 in communication with the pipe 252, and a compressed fuel outlet passageway 257 in communication with the pipe 253.

The body portion 255 is provided with a cylindrical chamber 258 having an opening 259 in communication with the inlet passageway 256 and an opening 260 in communication with the outlet passageway 257. The chamber 258 is provided with a piston valve 261 slidably disposed therein and adapted to open and close the opening 260.

A valve actuating rod 262 has one end fastened to the piston valve 261 and the other end attached to a valve actuating lever 263. A spring 264 is disposed in a chamber 265 of the body portion and is disposed above and concentric with the cylindrical chamber 258. The body portion 255 is provided with a partitioning portion 266 between the chambers 265 and 258 in which the valve actuating rod is slidably mounted. The spring 264 is disposed between a slidable piston plate 267 fixedly attached to the actuating rod 262 and the partitioning portion 266.

A cylindrical opening 268 is disposed above the passageway 257 and is concentric therewith. The body portion 255 is provided with a partition 269 which separates the cylindrical opening 268 from the passageway 257. The partition is provided with an opening 270 leading from the passageway 257 to the opening 268. The opening 270 adjoining the passageway 257 is adapted to receive a valve 271. The valve 271 is provided with a valve stem 272. A spring 273 is disposed within the opening 268 between a piston 274, adjustable on the valve stem, and the partition 269. The piston 274 is slidable within the opening 268. A passageway 275 in the body portion 255 provides communication between the cylindrical opening 268 and the exterior of the body portion.

The valve 271 is for the purpose of permitting air to enter the passageway 257 when the valve piston 261 cuts off communication between the passageway 256 and the passageway 257. This is for the purpose of overcoming the vacuum created by the engine when the supply of fuel is cut off.

As shown in Figures 5 and 9, the compressor valve housing is provided with a lever-arm shaft 276 mounted therein. The shaft 276 extends through the casing 1 and is provided with an arm 277 fixedly mounted thereon, as shown in Figure 2. Lever arms 278 and 279, see Figures 9 and 10, have one end fixedly mounted on the shaft 276 and their other ends in engagement with cam levers 204 and 205, respectively. A starter rod 280, as shown in Figures 5 and 15, has one end connected to the starter tube 234 in the engine valve housing, and extends through the compressor valve housing 135 and the casing 139, being slidable therein.

A block member 281, which might also be of a cylindrical or other desired shape, is fixedly mounted on the starter rod without the casing 139 as shown in Figures 5 and 7. The member 281 is provided with an angular recess 282 for receiving the top portion 283 of the arm 277. The cams and cam levers in both the engine valve housing and the compressor valve housing, see Figures 3 and 9 respectively, are for the purpose of positioning the valve tubes 176 whereby the compressed fuel is permitted to enter the piston chambers 169 for raising or lowering the pistons 170 and their respective partitioning plates 168. The partitioning plates 168 are only withdrawn from the cylinder chambers for permitting the pistons to pass by, consequently the valve tubes 176 will be in the position shown in Figure 14 a major part of the time. When they are in this position, the cam arms 194 and 204 are in the positions shown in the respective Figures 3 and 9.

When the cam portions 284 of the engine valve cams and the cam portions 285 of the compressor valve cams engage their respective cam arms, the cam arms are moved to the dotted line position shown at 286 in Figure 9, at which time the valve tubes 176, see Figure 14, move upwardly so that the compressed fuel then forces the pistons 170 downwardly, thereby withdrawing the partitioning plates 168 from their respective cylinder chambers. The compressed fuel beneath the pistons 170 in the chambers 169 is forced through the openings 175, beneath the valve tubes 176, through the openings 182, the passageways 180, and into the passageways 185 which lead to the fuel inlet passageway 150 of the compressor valve housing 135, see Figure 5.

It will be noted by referring to Figure 9 that by rotating the shaft 276 in the compressor valve housing, the arms 278 and 279 are moved to the dotted line position 287 thereby moving the cam levers 204 and 205 to the dotted line position 286, whereby the cam levers are thrown out of engagement with their respective cam plates. By means of this action, the valve tubes 176 are held in raised position, thereby holding the partitioning plates 168 in withdrawn position from the compressor unit cylinders. When the partitioning plates 168 of the compressor unit are held in their withdrawn positions, the pistons may rotate freely without compressing the fuel vapor.

It will readily be seen by referring to Figures 3, 12, and 23, that no structure is provided in the engine unit for disconnecting the engine cam levers from their respective cams whereby the partitioning plates of the engine unit may be held in withdrawn position from their respective cylinders. On the contrary, the engine cams, cam levers, and sliding valve tubes are so constructed that they cannot be thrown out of operative engagement. There are times when it is desirable not to have the compressor unit functioning, namely when the engine is being started and when the pressure of the compressed vapor fuel in the storage tank 244 has reached a predetermined amount.

It will be observed by referring to Figures 7 and 15, that when the starter tube 234 in the engine unit is actuated, the rod 280 and the member 281 move in a corresponding direction. Regardless of the direction of movement of the member 281, it will be seen that the top portion 283 of the arm 277, see Figure 2, is moved to the dotted line position at 288, thereby rotating the shaft 276 for throwing the compressor cam plates and their respective cam arms out of engagement, whereby the partitioning plates 168 in the compressor unit may be held in their withdrawn positions.

As shown in Figure 2, the junction 246, which is connected to the compressed-fuel tank, is provided with a pressure control valve 289, the construction of which is shown in Figure 16. The valve comprises a tubular casing 290 having a threaded end 291 receivable in a threaded opening 292 of the junction 246. A passageway 293 of less diameter than the opening 292 provides communication between the opening 292 and the chamber 294 of the junction 246.

The juncture of the opening 292 and the chamber 294 provides an annular shoulder 295. An annular ring 296 abuts the shoulder 295. A diaphragm 296′ is disposed between the end of the casing and the ring, sufficient space being provided between the edge of the diaphragm and the opening 292 to permit the diaphragm to function. The opposite end of the tubular member 290 is internally threaded at 297 for receiving a threaded plug 298 having an opening 299 extending therethrough.

A piston member 300 is slidably disposed in the tubular member 290 and is connected to a rod 301 slidably disposed in the opening 299 of the plug 298 and extending therethrough. A secondary rod 302 has one end connected to the rod 301 by a connecting member 303. The opposite end of the rod 302 is provided with a spherical shaped knob 304 receivable in an annular recess 305 of the arm 277, see also Figure 2. By rotating the plug 298, the pressure control valve may be adjusted to the desired pressure for being actuated.

When the pressure of the vaporized fuel in the tank has been built up to the maximum pressure desired, the diaphragm 296 is sprung to a position opposite to that shown in Figure 16. The springing of the diaphragm 296 compresses the air in the chamber 306 between the diaphragm and the piston 300, thereby sliding the piston away from the diaphragm. This movement is transmitted to the arm 277 for rotating the shaft 276, whereby the compressing unit will cease functioning. When the pressure in the tank 244 is lowered to a certain point, the diaphragm is moved back to the position shown in Figure 16 by reason of a spring 301' disposed between the piston 300 and the plug 298, whereby the compressor cams and their cam arms are thrown into engagement for actuating the partitioning plates 168 in the compressor unit thereby permitting the compressor unit to function.

It will be seen by referring to Figure 1 that spring means 307 is provided for returning the starting tube 234 to its normal position when the tube is not being actuated. When the starter tube 234 is in its normal position, shown in Figure 15, the compressor unit will be functioning unless the pressure control valve 289, see Figure 16, prevents it.

As shown in Figures 1 and 2, the carburetor 153 is in communication with a liquid fuel supply tank 308 by means of a feed pipe 309.

From the foregoing description of the various parts of the device, the operation thereof may be readily understood. Let it be assumed that the device has never been in use or has not been used for a long period of time, so that no vaporized fuel is contained within any part thereof. The handle 310 of the pump 154 shown in Figure 2 is manually actuated, but it might also be actuated by a motor deriving its energy from a storage battery. When the pump is actuated, a proper mixture of vaporized fuel and air is drawn from the carburetor and is forced through the pipe 248 and into the vaporized fuel tank 244.

It will also be observed, by referring to Figures 2, 7, and 8, that the fuel vapor is forced through the passageways 184 for entering the valve tubes 176 of both the compressor and engine units, whereby their respective partitioning plates are held in raised or lowered position, according to the position of the valve tubes 176. The fuel vapor also enters the passageway 157 of the compressor unit, but is prevented from entering the cylinders thereof by reason of the valve heads 160.

It is also seen from Figure 1 that the fuel vapor is forced through the pipe 249, the passageway 250, and the pipe 252 to the throttle valve, but is prevented from passing the piston valve 261 until the same is moved in the direction of the arrow 311, see Figure 20. Thus it will be seen, that by continuing the operation of the pump 154, the pressure of the fuel vapor in the tank 244 may be brought up to the desired pressure shown by the indicator 247.

When the piston valve 261 is moved in the direction of the arrow 311, the compressed fuel vapor passes through the pipe 253 and the passageway 251, see Figure 1, into the opening 219 between the spool valve flanges 211 and 212, shown in Figure 13. The passageway 233, see Figure 6, and the interior of the starter tube are thus filled with the fuel vapor by reason of their being in communication with the opening 219.

The engine unit and the compressor unit are each provided with two cylinder chambers, but it will be understood that they may be constructed for having more chambers if so desired. As shown in Figure 6, the piston contained in one cylinder is diametrically opposed to that contained in the other cylinder of the same unit, so that, referring particularly to the engine unit, one of the pistons is always in operable position.

It will be seen, by referring to Figures 2 and 13, that the openings 217 and 218 in the spool valve flanges of the engine unit may be so positioned that the compressed fuel vapor cannot pass to either of the cylinder chambers from the opening 219 via the passageways 220 and 221.

By referring to Figure 15, it will be observed that by moving the starter tube 234, communication may be established between the opening 219 and either of the passageways 220 and 221, whereby the compressed vapor fuel flows into either of the cylinder chambers for rotating the pistons by the pressure of the gas. The pistons are easily rotated by the pressure of the fuel gas because there is no compression to resist the rotation of the piston.

If the starter valve is actuated for supplying a cylinder chamber with fuel in which the position of the piston is between the fuel inlet opening and the exhaust opening, the piston will not be actuated as the vapor passes out through the exhaust. In this case, the starter tube is then moved for admitting the fuel vapor to the other cylinder chamber, in which case the piston contained therein rotates in the cylinder.

Before the starter tube is actuated, the ignition is turned on for energizing the spark plugs so that when a piston has revolved to a position similar to that shown in Figure 6, the gas in the chamber between the piston and the partitioning plate will be ignited for forcing the piston in the direction of the arrow 312. As the pistons rotate, the exhaust gases are forced out through the exhaust ports 228. The plates 39 and 47 are the means for imparting the rotary movement of the pistons to the shaft 32.

When the pistons are rotated by the explosion of the gases, the starter valve is released and returns to its normal position shown in Figure 15, the flow of the fuel into the cylinder chambers being then controlled by the spool valve.

It will be noted that the movements of the partitioning plates and the energizing of the spark plugs are synchronized with the movements of the pistons and shaft, and that when they are once timed, it will be difficult for the synchronization to be broken. The speed of rotation of the pistons is determined by the throttle valve which determines the rate of flow of the fuel to the cylinders.

Let us now refer to the vaporized fuel compressing unit 2 shown in Figure 1. In referring to Figure 5 it will be seen that the structure of the compressor unit is very similar to that of the engine unit with the major exceptions that no spark plugs are provided, and that the structure of the valve housing is different from that of the engine unit as has been hereinbefore described. In the compressor unit, the pistons are rotated by the shaft 32. When the pistons in the compressor unit are in the position of the piston 86 shown in the engine unit in Figure 6, and rotating in the direction of the arrow 312, the vaporized fuel is being drawn by the suction of the pistons into their respective cylinder chambers from the carburetor 153 by way of the pipe 152 and passageway 150, see Figure 5. As each piston rotates, the vapor drawn in by the preceding revolution is forced out through the fuel outlet passageway 156, as shown in Figure 10, and into the compressed fuel outlet passageway 157 from which it flows to the compressed fuel tank 244, the sliding tube valves 176, and the spool valve 213.

As shown in Figures 5 and 18, the exhaust fuel passageways 185, leading from the sliding tubular valves 176 in both the engine and compressor units, are in communication with the passageway 150, so that the exhausted fuel vapor from the valves is recompressed and passes through the system until it is used up in the engine unit. It will readily be seen by referring to Figure 10 that, when the compressor unit is functioning, the pistons meet with considerable resistance from the compressed fuel vapor, and that this resistance may be eliminated by holding the partitioning plates in withdrawn position from the cylinder chambers, whereby the compressor unit will cease to function. It is desirable to eliminate this resistance while the motor is being started, therefore the starting valve tube is provided with means, hereinbefore described, for holding the partitioning plates in their withdrawn positions during the starting of the motor. The compressor unit may then be permitted to function after the motor is running.

Let it be assumed that the ignition or throttle valve is shut off for stopping the motor. When it is desired to start the motor again, the pump 154 does not have to be actuated, but instead, the throttle lever or starting tube is actuated, whereby the pistons in the motor unit are rotated by the compressed fuel vapor until the explosions occur for driving the pistons.

It will be observed by referring to Figures 6 and 20 that when the motor is running and the fuel is shut off by the throttle valve 254, a powerful vacuum would be created within the fuel pipes and passageways between the throttle valve and the cylinder chambers if means were not provided for avoiding such a condition. The vacuum might also create a strong braking effect on the motor. The means for avoiding the vacuum comprises the valve 271, see Figure 20, which is not actuated when the fuel is passing through the throttle valve. When the fuel is shut off, the suction created by the rotating pistons pulls the valve 271 inwardly, thereby permitting air to enter the passageway 257 for overcoming the vacuum. When the throttle valve is reopened, the valve 271 seats itself for preventing an inflow of air. It will be observed that the valve 271 may be adjusted for regulating the inflow of air when the fuel supply is shut off, so that the motor may exert a weak or strong braking effect on the vehicle in which it is installed.

The casing may be provided with packing means wherever shafts, pipes, or similar members extend therethrough, for preventing the casing from leaking oil contained therein.

I claim:

1. A device of the type described comprising a fuel compressing unit and a fuel combustion unit, said units comprising housings having circular cylinder chambers provided with inlet and outlet openings, partitioning means disposed within the housings between the inlet and outlet openings, said partitioning means being insertable in and retractable from the cylinder chambers, a shaft mounted in said housings, pistons connected with the shaft and movable within the cylinder chambers, said compressing unit being in communication with a source of fuel and the combustion unit whereby fuel may be forced under pressure into said combustion unit, said combustion unit being adapted for energizing the fuel whereby the combustion unit pistons and the compressing unit pistons may be rotated, means in communication with the compressed fuel and actuated thereby for moving the partitioning means into and out of the cylinder chambers, means connected with the shaft for timing the movement of the partitioning means, means connected with the timing mechanism whereby the partitioning means of the compressing unit may be held in their retracted positions for preventing further compression of the fuel, and means in communication with the fuel supply whereby the fuel may be directed to any one of the combustion unit cylinder chambers when the starter means is actuated.

2. In a power mechanism, the combination of a power unit and a fuel compressor unit, each of said units being provided with cylinder chambers, a rotary shaft common to both units, pistons movably disposed in the cylinder chambers and connected with the shaft, a compressed fuel tank in communication with the cylinder chambers, said fuel compressor being in communication with a fuel supply means whereby said tank may be filled with compressed fuel, valve means for supplying the compressed fuel to the power unit cylinder chambers intermittently, means for preventing the compressor unit from functioning when the compressed fuel reaches a predetermined pressure, an auxiliary valve means operable for feeding the fuel to either of the power unit cylinder chambers continuously, and means operatively associated with the auxiliary valve means whereby said compressor unit may be prevented from compressing the fuel when said auxiliary valve means is actuated.

3. In a power mechanism, the combination of a power unit and a fuel compressor unit in communication with a source of fuel, a power shaft common to both units, each of said units being provided with cylinder chambers, pistons movably disposed in the cylinder chambers and connected with the shaft, a power valve housing and a compressor valve housing comprising a part of the power unit and the compressor unit respectively, said housings being provided with conduits for providing communication between the cylinder chambers, partitioning members movable into and out of the cylinder chambers, operating means in communication with the conduits for moving the partitioning members, a timing shaft rotatably mounted in the housings and operatively connected with the power shaft, said timing shaft being operatively associated with operating means for timing the movement of the partitioning plates, and valve means mounted on the timing shaft and in communication with the conduits for supplying the fuel to the power unit cylinder chambers intermittently.

4. In a power mechanism, the combination of a power unit and a fuel compressor unit in communication with a source of fuel, a power shaft common to both units, each of said units being provided with cylinder chambers, pistons movably disposed in the cylinder chambers and connected with the shaft, a power valve housing and a compressor valve housing comprising a part of the power unit and the compressor unit respectively, said housings being provided with conduits for providing communication between the cylinder chambers, partitioning members movable into and out of the cylinder chambers, operating means in communication with the conduits for moving the partitioning members, a timing shaft rotatably mounted in the housings and operatively connected with the power shaft, said timing shaft being operatively associated with operating means for timing the movement of the partitioning plates, valve means mounted on the timing shaft and in communication with the conduits for supplying the fuel to the power unit cylinder chambers intermittently, and an auxiliary valve means adapted for feeding the fuel to either of the power unit cylinder chambers continuously.

5. In a power mechanism, the combination of a housing provided with cylinder chambers, a power shaft rotatably mounted in the housing, pistons movably disposed in the cylinder chambers and connected with the shaft, a valve casing connected with the housing and provided with conduits in communication with a fuel supply means and the cylinder chambers, partitioning members movable into and out of the cylinder chambers, operating means in communication with the conduits for moving the partitioning members, a timing shaft rotatably mounted in the housing and operatively connected with the power shaft, said timing shaft being operatively associated with the operating means for timing the movement of the partitioning members, and valve means mounted on the timing shaft and in communication with the conduits for supplying the fuel to the cylinder chambers intermittently.

6. In a power mechanism, the combination of a housing provided with cylinder chambers, a power shaft rotatably mounted in the housing, pistons movably disposed in the cylinder chambers and connected with the shaft, a valve casing connected with the housing and provided with conduits in communication with a fuel supply means and the cylinder chambers, partitioning members movable into and out of the cylinder chambers, operating means in communication with the conduits for moving the partitioning members, a timing shaft rotatably mounted in the housing and operatively connected with the power shaft, said timing shaft being operatively associated with the operating means for timing the movement of the partitioning members, valve means mounted on the timing shaft and in communication with the conduits for supplying the fuel to the cylinder chambers intermittently, and an auxiliary valve means operable for feeding the fuel to either of the cylinder chambers continuously.

7. In a power mechanism, the combination of a housing provided with cylinder chambers, a power shaft rotatably mounted in the housing, pistons movably disposed in the cylinder chambers and connected with the shaft, a valve casing connected with the housing and provided with conduits in communication with a fuel supply means and the cylinder chambers, partitioning members movable into and out of the cylinder chambers, operating means in communication with the conduits for moving the partitioning members, a timing shaft rotatably mounted in the housing and operatively connected with the power shaft, said timing shaft being operatively associated with the operating means for timing the movement of the partitioning members, valve means mounted on the timing shaft and in communication with the conduits for supplying the fuel to the cylinder chambers intermittently, an auxiliary valve means operable for feeding the fuel to either of the cylinder chambers continuously and means for supplying the fuel under pressure to the cylinder chambers.

8. In a power mechanism, the combination of a power unit and a fuel compressor unit, each of said units being provided with cylinder chambers, a rotary shaft common to both units, pistons movably disposed in the cylinder chambers and connected with the shaft, partitioning members movable into and out of the cylinder chambers, said compressor unit being in communication with a fuel supply means and adapted for supplying the fuel under pressure to said power unit cylinder chambers, means operable by the compressed fuel for moving the partitioning members, and means associated with said last named means for retaining the partitioning members of the compressor unit in withdrawn positions with respect to the compressor unit cylinder chambers.

9. In a power mechanism, the combination of a power unit and a fuel compressor unit, each of said units being provided with cylinder chambers, a rotary shaft common to both units, pistons movably disposed in the cylinder chambers and connected with the shaft, partitioning members movable into and out of the cylinder chambers, said compressor unit being in communication with a fuel supply means and adapted for supplying the fuel under pressure to said power unit cylinder chambers, means operable by the compressed fuel for moving the partitioning members, and means associated with said last named means for retaining the partitioning members of the compressor unit in withdrawn positions with respect to the compressor unit cylinder chambers, when the compressed fuel exceeds a given pressure.

10. In a power mechanism, the combination of a power unit and a fuel compressor unit, each of said units being provided with cylinder chambers, a rotary shaft common to both units, pistons movably disposed in the cylinder chambers and connected with the shaft, partitioning members movable into and out of the cylinder chambers, said compressor unit being in communication with a fuel supply means and adapted for supplying the fuel under pressure to said power unit cylinder chambers, means operable by the compressed fuel for moving the partitioning members, means associated with said last named means for retaining the partitioning members of the compressor unit in withdrawn positions with respect to the compressor unit cylinder chambers, and valve means operable for feeding the fuel to either of the power unit cylinder chambers continuously.

11. In a power mechanism, the combination of a power unit and a fuel compressor unit, each of said units being provided with cylinder chambers, a rotary shaft common to both units, pistons movably disposed in the cylinder chambers and connected with the shaft, partitioning members movable into and out of the cylinder chambers, said compressor unit being in communication with a fuel supply means and adapted for supplying the fuel under pressure to said power unit cylinder chambers, means operable by the compressed fuel for moving the partitioning members, means associated with said last named means for retaining the partitioning members of the compressor unit in withdrawn positions with respect to the compressor unit cylinder chambers, valve means operable for feeding the fuel to either of the power unit cylinder chambers continuously, and means associated with the valve means and the means for moving the partitioning members for retaining the partitioning members of the compressor unit in withdrawn positions with respect to the compressor unit cylinder chambers when the valve means is actuated.

12. In a power mechanism, the combination of a power unit and a fuel compressor unit, each of said units being provided with cylinder chambers, a rotary shaft, pistons movably disposed in the cylinder chambers and connected with the shaft, partitioning members movable into and out of the cylinder chambers, a compressed fuel tank, said compressor unit being in communication with a fuel supply means and the tank for supplying the fuel under pressure to said power unit cylinder chambers, means operable by the compressed fuel for moving the partitioning members, and means associated with said last named means for retaining the partitioning members of the compressor unit in withdrawn positions with respect to the compressor unit cylinder chambers when the compressed fuel exceeds a given pressure.

Signed at Glidden in the county of Ashland and State of Wisconsin this 31st day of July A. D. nineteen hundred thirty.

FRANK X. HUBER.